United States Patent [19]

Minami

[11] Patent Number: 5,136,391
[45] Date of Patent: Aug. 4, 1992

[54] DIGITAL VIDEO TAPE RECORDER CAPABLE OF ACCURATE IMAGE REPRODUCTION DURING HIGH SPEED TAPE MOTION

[75] Inventor: Noriaki Minami, Osaka, Japan

[73] Assignee: Sanyo Electric Co., Ltd., Japan

[21] Appl. No.: 429,081

[22] Filed: Oct. 30, 1989

[30] Foreign Application Priority Data

Nov. 2, 1988 [JP] Japan ................. 63-277879
Dec. 28, 1988 [JP] Japan ................. 63-331059
Jun. 13, 1989 [JP] Japan ................. 1-151983

[51] Int. Cl.$^5$ .............................................. H04N 9/81
[52] U.S. Cl. ................................. 358/310; 358/312; 360/10.3; 360/23; 360/32
[58] Field of Search ............... 358/310, 312, 313, 330, 358/335, 341, 343, 183; 360/10.1, 10.3, 11.1, 19.1, 23, 24, 32, 33.1

[56] References Cited

U.S. PATENT DOCUMENTS

| | | | |
|---|---|---|---|
| 4,558,377 | 12/1985 | Collins et al. | 358/312 X |
| 4,689,697 | 8/1987 | Wilkinson | 360/10.3 X |
| 4,757,391 | 7/1988 | Hirota et al. | 358/310 X |
| 4,789,894 | 12/1988 | Cooper | 358/312 X |
| 4,811,116 | 3/1989 | Baumeister | 360/19.1 X |
| 4,847,701 | 7/1989 | Suesada | 358/312 X |
| 4,887,169 | 12/1989 | Bannai et al. | 358/312 X |
| 4,899,232 | 2/1990 | Odaka et al. | 360/32 X |
| 4,914,527 | 4/1990 | Asai et al. | 360/10.3 |
| 5,027,235 | 6/1991 | Furuyama | 360/10.3 X |

OTHER PUBLICATIONS

Wen-Hsiung Chen et al., "Adaptive Coding of Monochrome and Color Images", IEEE Transactions of Communications, Nov. 1977, vol. Com-25, No. 11, pp. 1285-1292.
Peter J. Burt et al., "The Laplacian Pyramid as a Compact Image Code", IEEE Transactions on Communications, Apr. 1983, vol. Com-31, No. 4, pp. 532-540.
Yasuhiko Yasuda et al., "Still Image Coding and Its Applications", Journal of the Institute of Electronics, Information and Communication Engineers, Jul. 1988, vol. 71, No. 7, pp. 669-675.
Satoshi Itoi et al., "An Experiment of Half Inch Consumer Digital VTR", ITBJ Technical Report, Dec. 21, 1988, vol. 12, No. 56, pp. 25-30.
NHK Giken Geppo (Monthly Report of NHK Laboratory), Apr. 1986, pp. 14-21.
Nikkan Kogo Shinbunsha, Image Digital Signal Processing, pp. 160-164, 187-189.

*Primary Examiner*—Roy N. Envall, Jr.
*Assistant Examiner*—W. R. Young
*Attorney, Agent, or Firm*—Peter L. Michaelson; Raymond R. Moser

[57] ABSTRACT

In a digital VTR, supplied digital video information is separated into 0th to second stage data by an information separating circuit (300) employing a hierarchical coding method. The 0th stage data are subjected to processes such as error correction as main information capable of roughly forming video signals by themselves. The first and second stage data are subjected to error correction and the like as subinformation forming details of the image. The main information and the subinformation are recorded on a magnetic tape such that the main information is recorded at the central portion of each recording track and the subinformation is recorded on both outer side portions of the recording track. During high speed reproduction, at least the main information is reproduced from the magnetic tape and rough video information is formed based on the reproduced main information.

15 Claims, 6 Drawing Sheets

REPRODUCTION AT 3 TIMES NORMAL SPEED

REPRODUCTION AT 5 TIMES NORMAL SPEED

DIGITAL VIDEO TAPE RECORDER CAPABLE OF ACCURATE IMAGE REPRODUCTION DURING HIGH SPEED TAPE MOTION

BACKGROUND OF THE INVENTION

1. Field of the Invention

The present invention relates to a digital video tape recorder (hereinafter referred to as a VTR) and, more specifically, to a digital VTR capable of forming a reproduced image at high speed based on digital video information reproduced by a rotary head while a tape is running at high speed in the fast forward direction or in the rewind direction.

2. Description of the Background Art

In a conventional digital VTR for digitally recording video information, error correcting information is added to digital video information at every prescribed period, for example, at every block period provided by dividing 1 field period into some blocks. The digital video information with error correcting information added in this manner is rearranged by block unit of information, that is, interleave processing is carried out in order to prevent continuous inaccuracy in the reproduced images caused by dropout or the like. Thereafter, the error corrected and interleaved digital video information is recorded on a magnetic tape by means of a rotary head. A digital VTR in accordance with the standard of CCIR is disclosed as an example of such a conventional digital VTR in pp. 14 to 21 of "NHK Giken Geppo (monthly report of NHK laboratory)" published in Apr., 1986. In this digital VTR, information is recorded on a magnetic tape while a composite rotary head capable of simultaneously recording signals of 2 channels is rotated at a speed six times as fast as the field frequency. Consequently, 12 recording tracks are formed on a tape in 1 field period, with the central portion of each of recording tracks allotted as an area for recording digital audio information. Such a recording format is employed in order to ensure reproduction of audio signals by providing a relatively small audio information area at the center of the track with which the head is brought into contact more stably than the outer portions of the track. The necessary area for recording audio information is relatively small, as the amount of audio information is small.

However, when information recorded on the magnetic tape in such a format is reproduced at high speed, that is, when information is to be reproduced with the tape running at high speed in the fast forward direction or the rewind direction, it is difficult to form a reproduced image based on the information reproduced from the tape. More specifically, high speed image reproduction is possible to some extent when what is recorded is conventional analog video signals. However, in the digital VTR, it is difficult to form a reproduced image at high speed, since the digital video signals are interleave processed to be recorded as described above, and it is difficult to perfectly reproduce recorded signals if there happens to be an error, as the amount of information itself is small.

SUMMARY OF THE INVENTION

Therefore, an object of the present invention is to enable formation of a reproduced image at high speed reproduction in a digital VTR.

Briefly stated, the digital VTR in accordance with the present invention comprises a circuit for supplying digital video information; an information separating circuit for separating the digital video information into main information enabling rough formation of the whole image and subinformation forming details of the image to supply the same; a first image processing circuit for carrying out error correcting process to the supplied main information; a second image processing circuit for carrying out error correcting process to the supplied from the first and second information processing circuits on a magnetic tape such that the output from the first video information processing circuit is recorded at the center of each of the recording tracks by n (n is a positive integer) field units and the outputs from the second information processing circuit are recorded on outer portions on both sides of the central portion of each recording track.

In accordance with another aspect of the present invention, the digital VTR further comprises a circuit for reproducing at least main information from the recording tracks while the magnetic tape on which the outputs from the first and second information processing circuits are recorded is running at a high speed, and a circuit for forming video information based on the reproduced main information.

In accordance with a further aspect of the present invention, the video information formed on the reproduced main information is a video signal having a variable rate of reduction, and the rate of reduction of the reproduced image can be changed corresponding to the amount of reproduced main information.

In accordance with a still further aspect of the invention, signals indicative of additional information which is to be displayed on a margin formed around the reduced image derived from the video signal are multiplexed on the video signal.

Therefore, a main advantage of the present invention is that a rough reproduced image can be formed based only on the main information reproduced during high speed reproduction, since the main information out of the video information is recorded by n field units at the center of each recording track.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
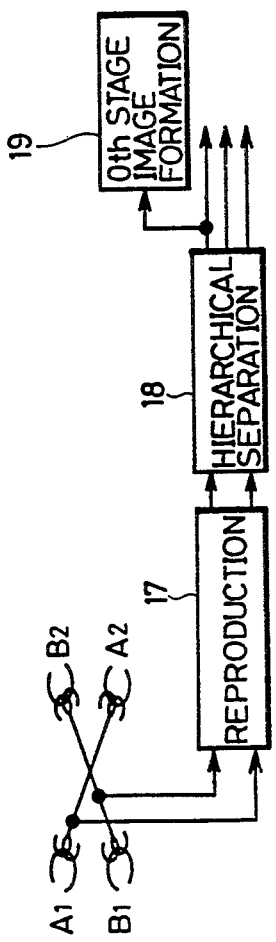
FIG. 1 is a block diagram showing a recording circuit of a digital VTR in accordance with a first embodiment of the present invention.

Referring to FIG. 1, a recording portion of a digital VTR in accordance with a first embodiment of the present invention will be described.

Figure 2:
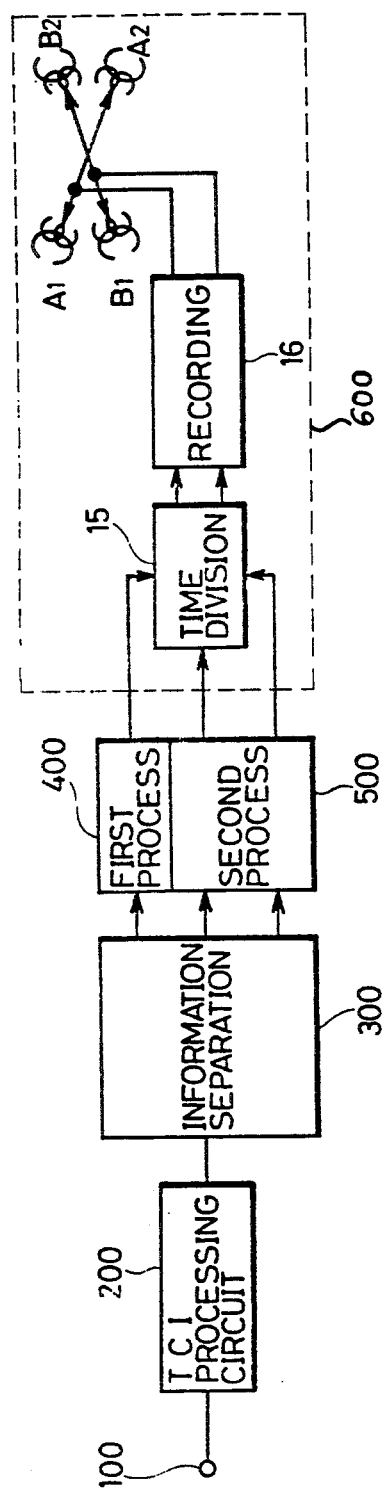
FIG. 2 schematically shows TCI processing of an analog video signal.

In FIG. 1, an analog video signal, that is, a signal comprising a luminance signal component Y and two different color difference signal components $C_1$ and $C_2$ are supplied from a video camera or a TV tuner, not shown, to an input terminal 100, which video signal is applied to a TCI (time compressed integration) processing circuit 200 through the input terminal 100. As shown schematically in FIG. 2, the TCI processing circuit 200 compresses on a time base the Y signal and the $C_1$ and $C_2$ signals of 1 horizontal period at a prescribed ratio, respectively, and time divisionally multiplexes these signals in a prescribed order in 1 horizontal period. The analog video signal formed by the time divisional multiplication in this manner is supplied to an information separating circuit 300.

The information separating circuit 300 separates the applied analog video signal into main information which enables rough formation of the whole image by itself during high speed reproduction, and subinformation forming details of the image. Various known methods can be employed for separating the analog video signal into main information and subinformation. In the present embodiment, a hierarchical coding method is employed, as will be described later. Such a hierarchical coding method is disclosed in, for example, Y. Yasuda et al. "Still Image Coding and Its Applications", pp. 669 to 675 of volume 71, No. 7, JOURNAL OF THE INSTITUTE OF ELECTRONICS, INFORMATION, AND COMMUNICATION ENGINEERS Jul., 1988, and in IEEE TRANSACTIONS ON COMMUNICATIONS, VOL. COM-31, No. 4, pp. 532 to 540, P. J. Burt et al. "The Laplacian Pyramid as a Compact Image Code", Apr., 1983.

Figure 3:
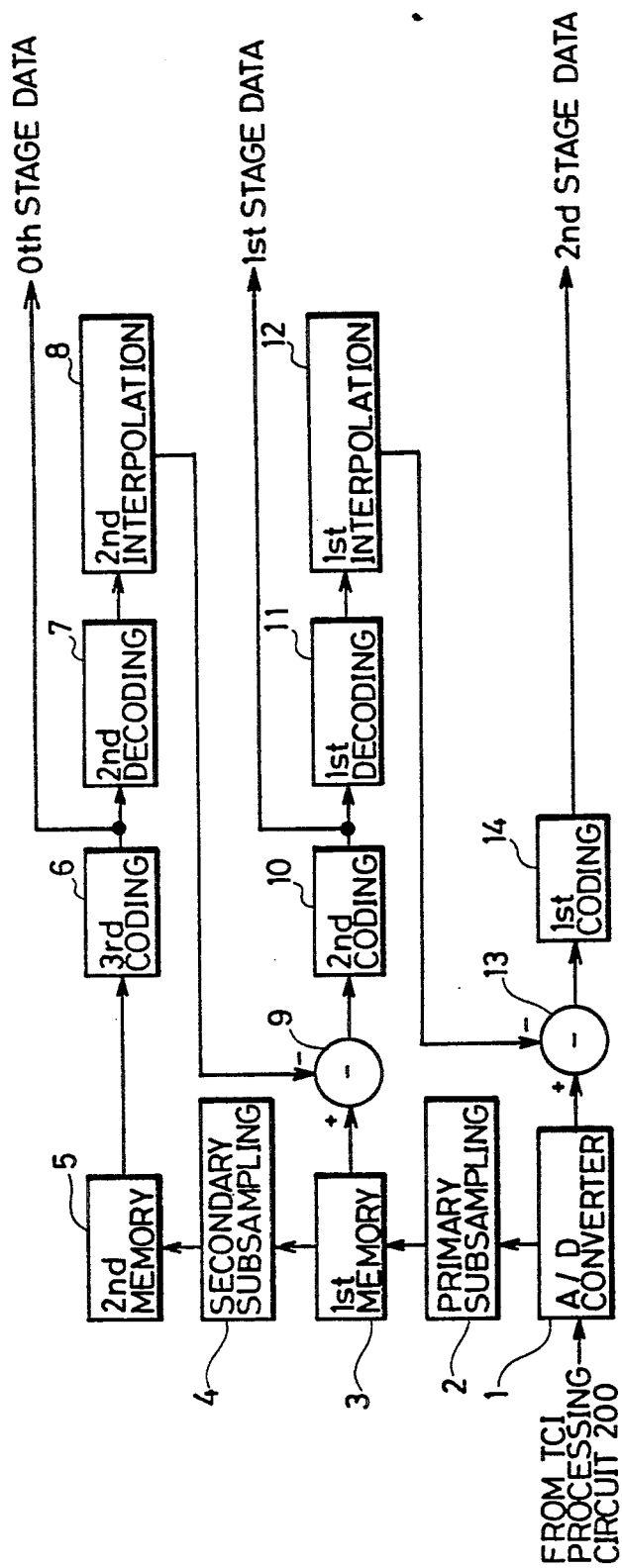
FIG. 3 is a block diagram showing the details of an information separating circuit of FIG. 1.

FIG. 3 is a block diagram showing the details of the information separating circuit 300 of FIG. 1 employing such a hierarchical coding method. Referring to FIG. 3, the analog video signal from the TCI processing circuit 200 is converted into a digital video signal by means of an A/D converter 1 to be applied to a primary sub-Nyquist sampling (hereinafter referred to as subsampling) circuit 2 and to a first difference circuit 13. The primary subsampling circuit 2 is a known circuit including a two dimensional spatial filter which forms information of a first stage image by limiting the high frequency of the applied digital video data to thin out the digital data (data compression), that is, by carrying out subsampling processing and applying the information to a first memory 3. Namely, details of the original video information are omitted by the subsampling process. The first stage image information stored in the first memory 3 is further applied to a second difference circuit 9 as well as to a secondary subsampling circuit 4. The secondary subsampling circuit 4 carries out the above mentioned subsampling process on the applied information of the first stage image to form information of 0th stage image to apply the same to a second memory 5. The information of the 0th stage image stored in the second memory 5 is applied to a third coding circuit 6 in which processes such as coding and compression, which will be described later, are carried out so as to reduce the amount (the number of bits) of information. The output from the third coding circuit, 6 is provided as the data of the 0th stage, which is the main information.

The 0th stage data are simultaneously applied to a second decoding circuit 7 in which decoding corresponding to the coding process by the third coding circuit 6 is carried out. The output from the second decoding circuit 7 is applied to a second interpolating circuit 8 in which interpolation corresponding to the subsampling process by the secondary subsampling circuit 4 is carried out. The output from the second interpolating circuit 8 is inputted to a second difference circuit 9 in which subtraction with the information of the first stage image is carried out. The resulting difference data are applied to a second coding circuit 10 in which coding and compressing process, which will be described later, is carried out and then they are provided as the first stage data which are the subinformation.

The first stage data are simultaneously applied to a first decoding circuit 11 in which decoding corresponding to the coding process by the second coding circuit 10 is carried out. The output from the first decoding circuit 11 is applied to a first interpolating circuit 12 in which interpolation corresponding to the subsampling process by the primary subsampling circuit 2 is carried out. The output from the first interpolating circuit 12 is inputted to the first difference circuit 13 in which subtraction with the original video information is carried out. The resulting difference data are applied to a first coding circuit 14 in which a coding and compressing process, which will be described later, is carried out, and, they are provided as the second stage data which is the subinformation.

The rate of data compression in the first, second and third coding circuits, 14, 10 and 6 can be changed, respectively, and accordingly the amount of data of respective stages can be changed by appropriately changing the compression rate of the corresponding coding circuit.

In the embodiment shown in FIG. 3, a fixed length encoder is used as the third coding circuit 6 and variable length encoders are used as the first and second coding circuits 14 and 10.

More specifically, the amount of output data from the third coding circuit 6 consisted of the fixed length encoder will be a constant value in 1 field unit.

The amount of data output data from the first and second coding circuits 14 and 10, each consisting of variable length encoder, will be a constant value in n field (n is an integer no less than 2) units. Various known systems may be employed for the variable length encoders. However, in the present embodiment, ABDPCM (Adaptive Block Discrete Pulse Code Modulation) method is employed, as will be described later. This method is disclosed in, for example, ITBJ Technical Report Vol. 12, No. 56, pp. 25 to 30, S. Itoi et al. "An experiment of Half Inch Consumer Digital VTR", Dec. 21, 1988.

Briefly stated, in this method, an image is divided into a plurality of blocks, the data amount in the field is made constant in each block, and coding mode for each block is selected so as to minimize coding distortion in each block. The code length of the whole block is changed dependent on the selected coding mode. By such an adapting process, the distortion in coding can be minimized in each block, and the quality of the image as a whole can be improved.

This ABDPCM method is applied to the present invention for coding the first and second stage data, that is, the subinformation, as described above and as a result, the amount of data is controlled to be constant in n field units. For example, when n=4, the amount of data in the first and second coding circuits 14 and 10 is controlled to be constant in 4 fields, that is, 2 frame unit. By such structure, higher image quality can be expected than when fixed length encoders are used as the first and second coding circuits 14 and 10. More specifically, since the definition of an image is different in each block when the image is divided into a plurality of blocks, higher image quality can be expected when the amount of data is allotted in proportion to the definition rather than when the data amount in every block is made constant. In this case, the main information is recorded at the center of each recording track by the field unit, and the subinformation is recorded on regions on both sides of the center of each track, as will be described later.

Now, when n is set to n=4, as mentioned above, the control of the data amount is carried out in a 2 frame unit. Therefore, an interframe prediction to reduce the amount of data by coding the difference between continuous frames can be employed to improve the image quality. However, the value n cannot be set very large, as the VTR is used for editing.

The main information, that is, the 0th stage data provided from the information separating circuit 300 in this manner is inputted to the first processing circuit 400 of FIG. 1. The first processing circuit 400 adds error correcting data to the inputted 0th stage data at every block period provided by dividing 1 field period into some blocks and carries out interleaving process to form first processed data.

Meanwhile, the subinformation, that is, the first stage and the second stage data provided from the information separating circuit 300 are inputted to the second processing circuit 500 of FIG. 1. The second processing circuit 500 adds error correcting data to each of the inputted data of the respective stages, and carries out an interleaving process by field unit for the first and second stage data to form second processed data including two different types of data.

The first and second processed data are applied to a time divisional processing circuit 15 in a recoding circuit 600. The time divisional processing circuit 15 functions to divide the second processed data of 1 field into two and to time divisionally multiplex the first processed data therebetween. More specifically, the time divisional processing circuit 15 forms time divisionally multiplexed data in which data are multiplexed in the order of the second stage data, the first stage data, the 0th stage data, the first stage data, and the second stage data in 1 field period, then applies the same to the recording processing circuit 16. The recording processing circuit 16 forms 2 channels of data TA and TB corresponding to an image of 1 field based on the applied data and converts the same into signal, formats suitable for recording on a magnetic tape via rotary magnetic heads, A1, B1, A2 and B2.

To explain more specifically, the four rotary heads constitute a first composite head including A1 and B1 and a second composite head including A2 and B2. Each of the composite heads comprises an A azimuth rotary head and a B azimuth rotary head fixed adjacent to each other with a step corresponding to 1 pitch of the track provided, and the pair of composite heads are fixed on a rotary cylinder (not shown) opposing to each other by 180°. The rotary cylinder rotates in a frame period, and the above mentioned pair of composite heads alternately scan the tape wound therearound over 180°. Consequently, recording tracks of 2 channels, that is, A azimuth and B azimuth are formed, two in each field.

Figure 4:
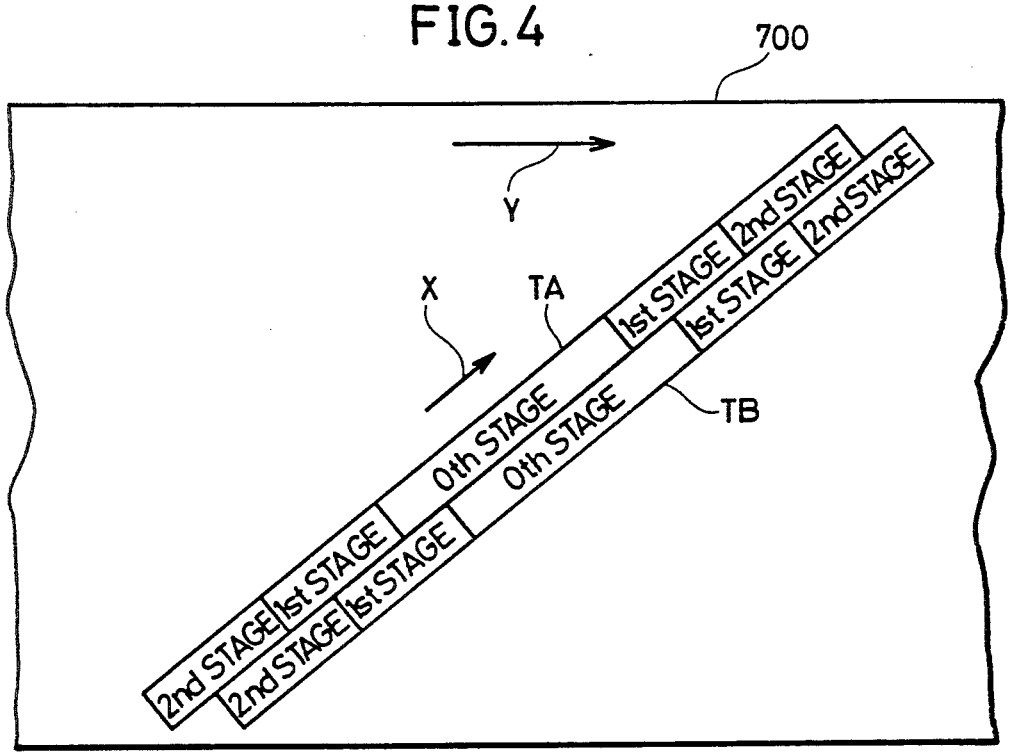
FIG. 4 schematically shows arrangement of information of recording tracks formed on a tape in accordance with the first embodiment of the present invention.

FIG. 4 shows arrangement of recorded information on two recording tracks TA and TB formed on the tape 700 by one scanning of one composite head. In the figure, the arrow X represents the direction of scanning by the head and the arrow Y represents the tape running direction. At the center of each recording track, the 0th data as the main information are recorded, the first stage data as the subinformation are recorded on both sides thereof, and the second stage data as the subinformation are recorded further outside thereof.

Figure 5:
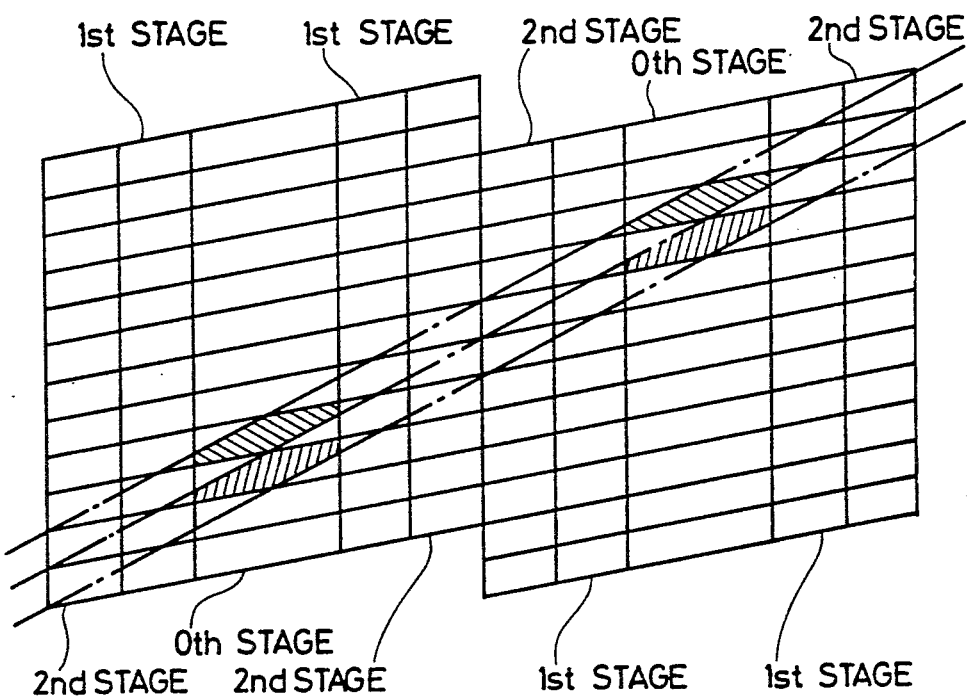
FIG. 5 schematically shows track patterns in reproducing at three times normal speed in accordance with the first embodiment of the present invention.

When the information recorded on the above described manner is to be reproduced while the tape is running at high speed, the rotary head scans for reproduction over a plurality of recording tracks. FIG. 5 schematically shows a track pattern of reproduction at three times normal speed. The tracking control is carried out such that the state of tracking is optimized at the central portion of each track. As shown in FIG. 5, each rotary head scans at least only the main information recorded portion at the center of the recording track on which the 0th stage data are recorded, and the recorded information are continuously reproduced in the main information recorded portion.

Figure 6:
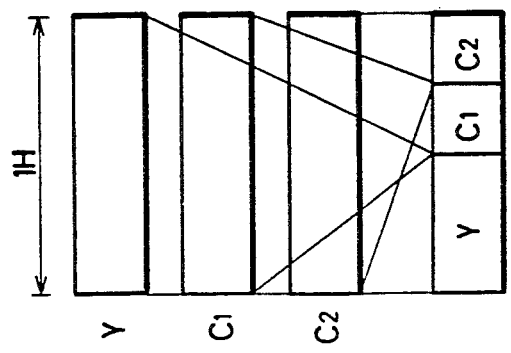
FIG. 6 is a block diagram showing a circuit for processing data reproduced from the head during high speed reproduction in the digital VTR in accordance with the first embodiment of the present invention.

FIG. 6 shows a circuit for processing the data reproduced from the head during the above described high speed reproduction. Referring to FIG. 6, the 2 channel signals reproduced by the composite head including the heads, A1 and B1, are decoded in a reproduction processing circuit 17 to be 2 channels of reproduced data. The reproduced data are converted into data of respective stages by a hierarchical separating circuit 18 in the succeeding stage. In normal reproduction, the data of respective stages are all properly reproduced by the hierarchical separating circuit 18. However, in the high speed reproduction as described above, only the 0th stage data as the main information are properly reproduced. Therefore, at the time of high speed reproduction, only the 0th stage data are applied to 0th stage image forming circuit 19, which circuit 19 forms the rough reproduction video signal based only on the 0th stage data to output the same. The rough reproduction video signal is applied to an external displaying apparatus such as a monitor TV, and a rough image is reproduced on the screen. This enables formation of a reproduced image of sufficient quality to grasp the content during high speed reproduction.

In the above described first embodiment, the hierarchical coding method is used for separating the analog video signal into main information and subinformation. Other known methods such as orthogonal transform coding method or intrablock prediction coding method may be used to provide the same effect. The former mentioned method is disclosed in pp. 187 to 189 and the latter method is disclosed in pp. 160 to 164 of "Image Digital Signal Processing" published by Nikkan Kogo Shinbunsha.

Namely, instead of the hierarchical coding method, a method for dividing the video information into main information and subinformation in accordance with an order of a conversion coefficient for orthogonal transform coding to determine the amount of subinformation dependent on the amount of high frequency component of each block, or a method of using of non-compressed data of the ABDPCM method as the main information and other data as the subinformation may be applied.

Although the ABDPCM method was employed for the variable length encoder in the above described embodiment, other known methods, for example the ADCT (Adaptive Discrete Cosine Transform) method may be employed to provide the same effect. The ADCT method is disclosed in, for example, IEEE TRANSACTIONS OF COMMUNICATIONS, VOL. COM-25, No. 11 PP. 1285 to 1292, Wen-Hsiung Chen et al. "Adaptive Coding of Monochrome and Color Images", Nov., 1977. In the ADCT method, larger numbers of bits are allotted to those portions of an image such as the edge of the image where a signal changes considerably, while smaller number of bits are allotted in flat portions.

Now, although the quality of the image reproduced at high speed provided in the first embodiment is rough, the quality is sufficient to grasp the content thereof. The roughness can be reduced when the image plane is reduced in size.

Figure 7:
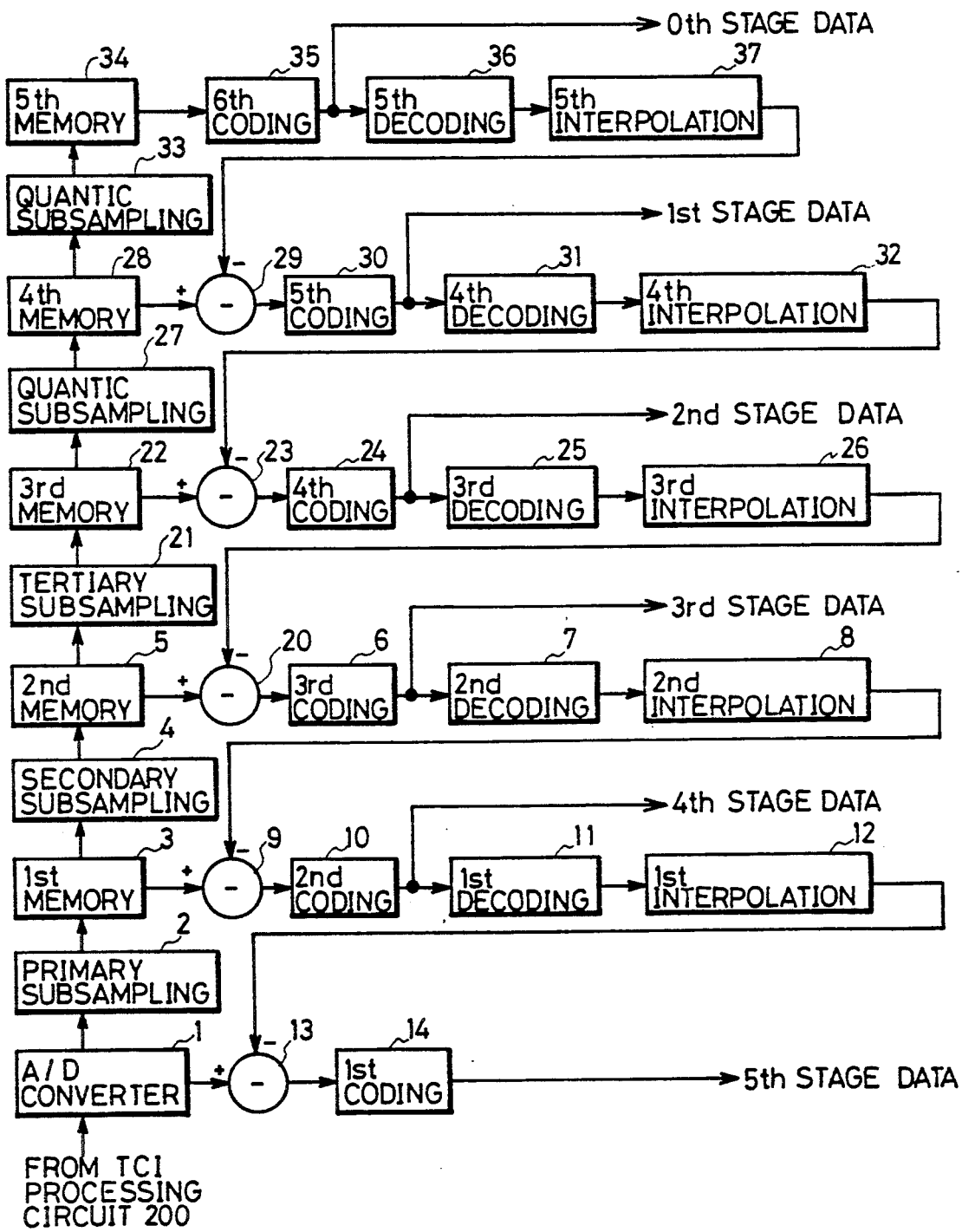
FIG. 7 is a block diagram showing details of an information separating circuit of a digital VTR in accordance with a second embodiment of the present invention.

In the second embodiment of the present invention described in the following, the size of the image plane of high speed reproduction is set in accordance with the stages of the data which can be reproduced, and additional information are indicated on margins around the image plane for reproduction. FIG. 7 is a block diagram showing the details of the information separating circuit in the recording portion of the digital VTR in accordance with the second embodiment. In the embodiment shown in FIG. 7, data from 0th stage to 5th state are formed, and the following components are added to the circuit structure of first embodiment shown in FIG. 3.

Namely, a third decoding circuit 25, a third interpolating circuit 26 and a third difference circuit 20 are provided for forming the third stage data. In addition, a tertiary subsampling circuit 21, a third memory 22, a fourth decoding circuit 31, a fourth interpolating circuit 32, a fourth difference circuit 23 and a fourth coding circuit 24 are provided for the second stage data. A quartic subsampling circuit 27, a fourth memory 28, a fifth decoding circuit 36, a fifth interpolating circuit 37, a fifth difference circuit 29 and a fifth coding circuit 30 are provided for forming the first stage data. In addition, a quintic subsampling circuit 33, a fifth memory 34 and a sixth coding circuit 35 are provided for forming the 0th stage data. Out of the first to sixth coding circuits, the first, second and length encoders and the fourth, the fifth and the coding circuits 24, 30 and 35 are formed by fixed length encoders. The data of the 0th stage to the fifth stage are formed in the same manner as those of the first embodiment shown in FIG. 3, so that the description thereof is not repeated.

Figure 8:
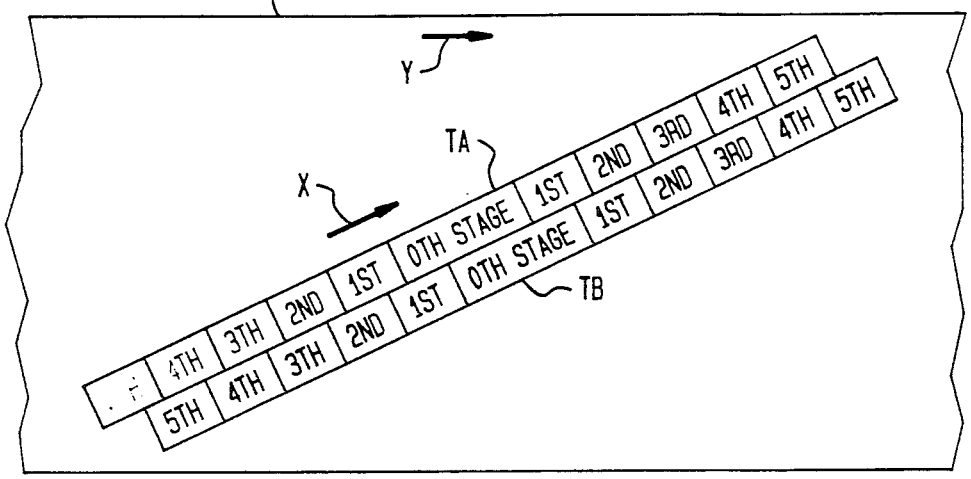
FIG. 8 schematically shows arrangement of information of recording tracks formed on a tape in accordance with the second embodiment of the present invention.

FIG. 8 schematically shows the arrangement of recorded information on the recording tracks of the tape in accordance with the second embodiment. Referring to FIG. 8, the recording tracks TA and TB represent recording tracks simultaneously formed on the tape by one composite head, the recording azimuth being different from each other. In FIG. 8, the 0th stage data are recorded at the center of each recording track. The first stage data are recorded on both sides thereof the second stage data are recorded further outside thereof, the third stage data are recorded further outside, the fourth stage data are recorded further outside and the fifth stage data are recorded further outside thereof.

Figure 9:
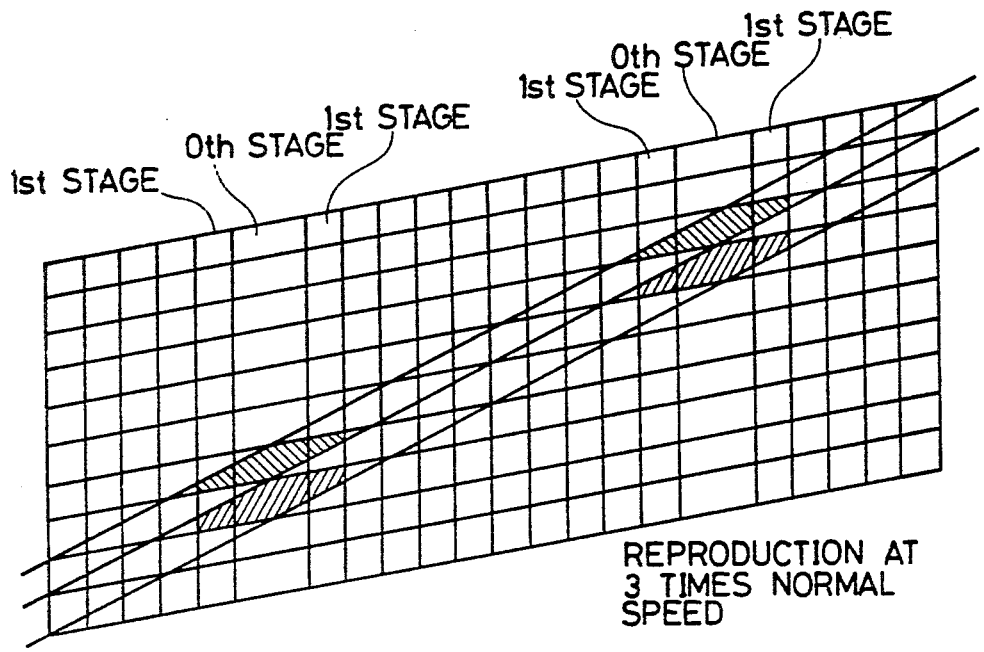
FIG. 9 schematically shows track patterns of reproduction at three times normal speed in accordance with the second embodiment of the present invention.
Figure 10:
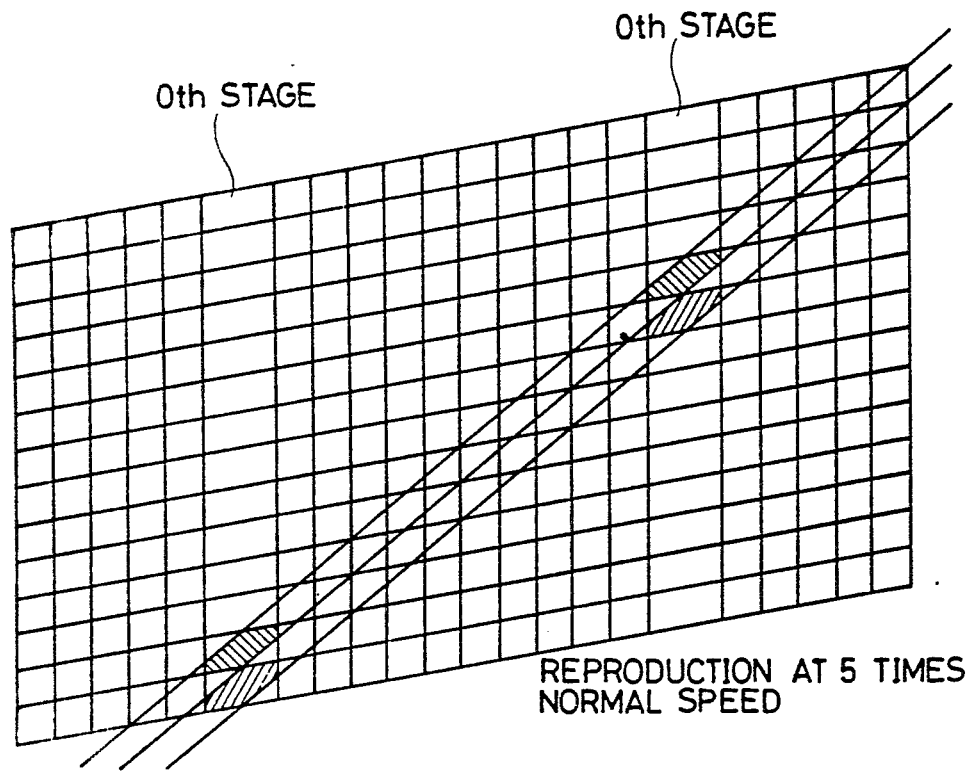
FIG. 10 schematically shows track patterns in reproduction at five times normal speed in accordance with the second embodiment of the present invention.

FIGS. 9 and 10 show relations between the recording track pattern in reproducing information recorded in the above described manner while the tape is running at high speed and the tracks of scanning of the reproduction head. FIG. 9 shows reproduction at three times normal speed and FIG. 10 shows reproduction at five times normal speed. As is apparent from these figures, when information is reproduced three times normal speed (FIG. 9), the 0th stage data and the first stage data are effectively reproduced as main information, and when the information is reproduced at five times normal speed (FIG. 10), only the 0th stage data are reproduced effectively as the main information.

Figure 11:
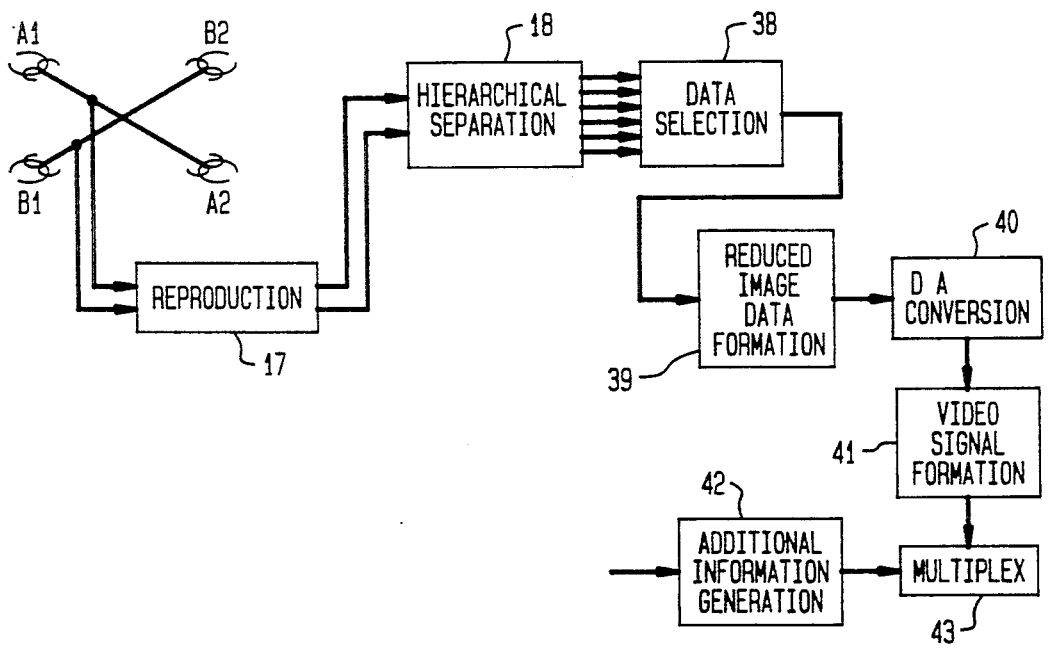
FIG. 11 is a block diagram of a circuit processing data reproduced from the head during high speed reproduction in the digital VTR in accordance with the second embodiment of the present invention.
Figure 12A:
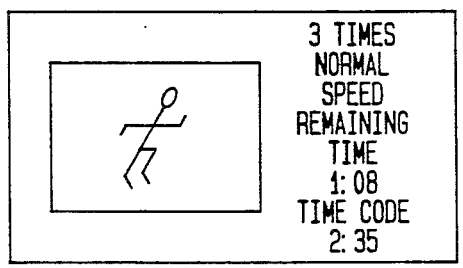
FIGS. 12(A) and (B) schematically show examples of display patterns in a high speed reproduction mode in accordance with the second embodiment of the present invention.
Figure 12B:
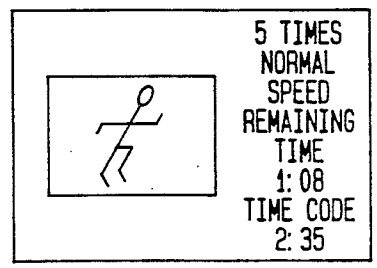

FIG. 11 shows a reproduction circuit for processing data reproduced from a head during high speed reproduction in accordance with the second embodiment of the present invention. In the reproducing circuit shown in FIG. 11, the data of respective stages outputted from the data separating circuit 18 are applied to a data selecting circuits 38. The data selecting circuit 38 selects and provides only the effective stage data corresponding to how many times as fast as the normal speed the information is to be reproduced. The effective stage data provided from the data selecting circuit 38 are applied to a reduction image data forming circuit 39 which circuit 39 forms digital data to form a reduce image in accordance with the speed of reproduction to apply the same to a D/A converter 40. The analog signal provided by the D/A converter 40 is applied to a video signal forming circuit 41. The video signal forming circuit 41 adds a synchronization signal and a blue back signal for the margin around the image plane to the applied analog video signal. The video signal formed in this manner is applied to one input of a multiplexing circuit 43. Meanwhile, mode information, information of the tape remaining time, time code information (information of the past time) and so on which are to be multiplexed over the blue black portion are applied as character pattern signals to the other input portion of the multiplexing circuit 43 from an additional information generating circuit 42. Therefore, multiplex signals indicative of the reduced image plane and the above mentioned additional information are outputted from the multiplexing circuit 43. FIG. 12(A) shows an example of a display pattern in a three times normal speed mode provided in this manner, while FIG. 12 (B) shows an example of the display pattern in the five times normal speed mode provided in this manner. The size of the reduced image plane becomes smaller as the speed is increased, and various additional information are displayed on the margin on the right side thereof.

The combination of the fixed length encoders and the variable length encoders in the circuit structure of FIG. 7 is only an example and it may be changed corresponding to various applications.

Although the main information is adapted to be recorded at the center of the recording track, by 1 field unit during recording in each of the above described embodiments, such processes may be carried out by n (n is a positive integer) field units.

As described above, in accordance with the embodiments of the present invention, a reproduced image having necessary definition can be formed based on the reproduced video information during high speed reproduction in a digital VTR.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital video tape recorder, comprising:
    means for supplying digital video information (100, 200, 1);
    video information separating means (300) for dividing said digital video information into main information capable of roughly forming a whole image and subinformation forming details of the image and outputting the main and subinformation;
    first video information processing means (400) for carrying out an error correcting process on said outputted main information;
    second video information processing means (500) for carrying out an error correcting process on said outputted subinformation;
    recording means (600) for recording outputs from said first and second video information processing means on tracks on a magnetic tape such that output from said first video information processing means is recorded at the center of each recording track in n, n is a positive integer, field units and the output from said second video information processing means is recorded on outer portions of said recording track on both sides of said center.

2. A digital video tape recorder according to claim 1, wherein
    said means for supplying digital video information includes
    means (100) for supplying analog video information including a luminance signal component and a color difference signal component,
    time compressed integration processing means (200) for time base compressing and time divisionally multiplexing said luminance signal component and said color difference signal component, and
    means (1) for converting a signal provided by said time compressed integration processing means into said digital video information.

3. A digital video tape recorder according to claim 1, wherein
    said video information separating means includes
    first to mth subsampling means (2, 4, 21, 27, 33) for carrying out first to mth, m is a positive integer, subsampling processes stepwise on said digital video information, and
    first to (m+1)th stage data forming means (14, 10, 6, 24, 30, 35) for forming mth to 0th stage image data, respectively, based on said digital video information and on outputs from said first to mth subsampling means, and
    said video information separating means supplies 0th to lth, l is 0 or a positive integer, stage image data as said main information and image data of other stages as said subinformation.

4. A digital video tape recorder according to claim 3, wherein
    said video information separating means includes
    first and second subsampling means (2, 4) and
    first to third stage data forming means (14, 10, 6) for forming second to 0th stage image data, respectively, and
    said video information separating means supplies said 0th stage image data as said main, information and said first and second stage image data as said subinformation.

5. A digital video tape recorder according to claim 4, wherein
    said third stage data forming means includes third subsampling means to supply the same as the 0th stage image data,
    said second stage data forming means includes second coding means (10) for coding a difference between an output from said first subsampling means and said 0th stage image data to supply the same as the first stage image data, and
    said first stage data forming means includes first coding means (14) for coding a difference between said digital video information and said first stage image data to supply the same as the second stage image data.

6. A digital video tape recorder according to claim 5, wherein
    said third coding means is a fixed length coding means, and said second and first coding means are variable length coding means.

7. A digital video tape recorder according to claim 3, wherein
    said video information separating means includes
    first to fifth subsampling means (2, 4, 21, 27, 33) and
    first to sixth stage data forming means (14, 10, 6, 24, 30, 35) for forming fifth to 0th stage image data, respectively, and
    said video information separating means supplies said 0th stage image data or said 0th and said first stage image data as said main information and image data of other stages as said subinformation.

8. A digital video tape recorder according to claim 7, wherein
    said sixth stage data forming means includes sixth coding means (35) for coding an output from said fifth subsampling means to supply the same as the 0th stage image data,
    said fifth stage data forming means includes fifth coding means (30) for coding a difference between an output from said fourth subsampling means and said 0th stage image data to supply the same as the first stage image data,
    said fourth stage data forming means includes fourth coding means (24) for coding a difference between an output from said third subsampling means and said first stage image data to supply the same as the second stage image data, said third stage data forming means includes third coding means (6) for coding a difference between an output from said second subsampling means and said second stage image data to supply the same as the third stage image data, said second stage data forming means includes second coding means (10) for coding a difference between an output from said first subsampling means and said third stage image data to supply the same as the fourth stage image data, and said first stage data forming means includes first coding means (14) for coding a difference between said digital video information and said fourth stage image data to supply the same as the fifth stage image data.

9. A digital video tape recorder according to claim 8, wherein said fourth, said fifth and said sixth coding means are fixed length coding means, and said first, said second and said third coding means are variable length coding means.

10. A digital video tape recorder according to claim 1, wherein said recording means comprises means (15) for time divisionally multiplexing outputs from said first and second video information processing means.

11. A digital video tape recorder according to claim 1, further comprising:

means (17, 18, 38) for reproducing at least said main information from said recording track while running at high speed a magnetic tape on which the outputs from said first and second video information processing means are recorded; and means (19, 39, 40, 41) for forming video information based on said reproduced main information.

12. A digital video tape recorder according to claim 11, wherein the video information reproduced based on said reproduced main information is a video signal with variable rate of reduction, the digital video tape recorder further comprising means (39) for changing said rate of reduction in correspondence with an amount of said reproduced main information.

13. A digital video tape recorder according to claim 12, wherein said rate of reduction becomes smaller as the amount of said main information becomes smaller.

14. A digital video tape recorder according to claim 12, further comprising:

means (42) for supplying a signal indicative of additional information to be displayed on a margin formed around a reduced image by said video signal; and means (43) for multiplexing said video signal and said additional information signal.

15. A digital video tape recorder according to claim 1, wherein said main information is formed by fixed length coding and said subinformation is formed by variable length coding.

* * * * *